(12) United States Patent
Johnson et al.

(10) Patent No.: US 6,644,620 B2
(45) Date of Patent: Nov. 11, 2003

(54) DISPENSING VALVE WITH HELICAL FLOW ORIFICE

(75) Inventors: Martin Johnson, Itchington (GB); Joseph E. Holland, Birmingham (GB); Henry B. Wisnieski, Evesham (GB)

(73) Assignee: IMI Cornelius Inc., Anoka, MN (US)

( * ) Notice: Subject to any disclaimer, the term of this patent is extended or adjusted under 35 U.S.C. 154(b) by 44 days.

(21) Appl. No.: 09/934,277

(22) Filed: Aug. 21, 2001

(65) Prior Publication Data

US 2002/0027212 A1 Mar. 7, 2002

(30) Foreign Application Priority Data

Aug. 22, 2000 (GB) .............................................. 0020638

(51) Int. Cl.[7] .............................................. F16K 31/02
(52) U.S. Cl. ................... 251/126; 251/129.01; 222/504
(58) Field of Search ................................ 251/126, 127, 251/119, 129.01; 222/564, 504; 239/482, 483, 486, 487, 489, 501

(56) References Cited

U.S. PATENT DOCUMENTS

| 1,540,529 | A | * | 6/1925 | Blaisdell ...................... 251/126 |
|---|---|---|---|---|
| 1,784,609 | A | * | 12/1930 | Moulder ...................... 251/126 |
| 2,105,314 | A | * | 1/1938 | Duncan et al. ............. 251/126 |
| 3,252,480 | A | * | 5/1966 | Odendahl et al. ........... 251/126 |
| 3,841,354 | A | * | 10/1974 | McDonnell .................. 251/126 |
| 3,907,249 | A | * | 9/1975 | Persson ....................... 251/126 |
| 4,176,683 | A | * | 12/1979 | Leibinsohn .................. 251/126 |
| 4,632,359 | A | * | 12/1986 | Tooth .......................... 251/126 |
| 4,634,434 | A | * | 1/1987 | Marino et al. ............... 251/126 |
| 4,653,695 | A | * | 3/1987 | Eckstein ...................... 251/126 |
| 4,739,901 | A | * | 4/1988 | Dorfman et al. ............ 222/564 |

* cited by examiner

Primary Examiner—Gene Mancene
Assistant Examiner—John Bastianelli
(74) Attorney, Agent, or Firm—Sten Eric Hakanson (57) ABSTRACT

A dispensing valve is shown that controls the flow of a fluid, the valve having a housing containing a cylindrical/tubular passageway between an inlet and outlet of the valve. A rod like closure member is operable to move through the passageway from a first position in which the valve is fully closed, to a second position in which the valve is fully open. The exterior surface of the closure member engages the interior surface wall of the passageway to seal the passageway and the interior surface wall and/or the exterior surface of the closure member have helical/spiral grooves therein. A spiral flow passage is defined through which the fluid can flow on its passage from the inlet to the outlet when the closure member moves away from its first position. Further movement of the closure member towards the second position regulates the flow rate of the fluid through the passageway.

3 Claims, 8 Drawing Sheets

DISPENSING VALVE WITH HELICAL FLOW ORIFICE

This invention relates to a valve. It is of particular applicability to a control valve that can be used as a settable coolant flow valve or as a dispense valve for beverages, e.g. to control flow of syrups and carbonated water to a dispenser. However, it will be appreciated that the invention is not limited to valves for such uses and they may equally find use, for example, in refrigeration units.

It is an object of the invention to provide a valve that is suitable for use as a control valve that can be maintained for a period of time in a partially open configuration or can be used in a situation where frequent opening and closing of the valve is required.

It is also an object of the invention to provide a valve which can be set with precision to any position in a desired range of partially open configurations between the fully closed and fully open positions and which can demonstrate a high degree of flow linearity between the fully closed and fully open positions.

Ingress of particles of dirt can cause problems in many valve systems. In addition to getting trapped between valve closure surfaces, where they can damage valve ports or seats, dirt particles can obstruct the cross-sectional area available for flow, and thereby alter predicted flow rates for a given valve opening. Thus it will be appreciated that this can be a particularly serious problem if a valve is particularly intended for use in a partially open, set configuration.

It is a further object, therefore, of the present invention, to provide an improved control valve in which the problems caused by dirt particles can be avoided or at least ameliorated.

Accordingly the invention provides a valve to control flow of a fluid, the valve comprising a housing containing a passageway between an inlet and an outlet of the valve, a closure member movable in the passageway from a first position in which the valve is fully closed to a second position in which the valve is fully open, the closure member engaging the wall of the passageway to seal the passageway, the wall of the passageway and/or the closure member defining a spiral groove which acts as a flow channel through which the fluid can flow on its passage from the inlet to the outlet when the valve is open, movement of the closure member from the first position towards the second position opening the flow channel through the spiral groove.

Thus flow through the valve can take place via the spiral groove when the closure member is moved from the first position to any partially open or to the fully open, i.e. second, position.

The groove may have a transverse cross-section that is constant or that increases in area in the upstream or downstream direction.

As the spiral groove may progressively increase in transverse cross-sectional area in the upstream or downstream direction, the valve can provide excellent linear flow and so that for a given pressure the flow rate may be more directly proportional to the valve closure member position than for conventional valves. This enables accurate flow modulation to be achieved, i.e. better control of the flow rate, over the entire operating range of the valve. Moreover, we have found that this construction of flow channel through the valve surprisingly results in reduced carbon dioxide breakout when carbonated water is passed through the valve.

However, a spiral groove of constant cross-section along its length also has useful application and can allow accurate positioning to provide precision from low flow through to high flow values through the valve.

The housing is preferably made of a substantially rigid material, e.g. metal, plastics material or ceramic material, and the closure member is also preferably substantially rigid and may be of the same material as the housing.

Suitably rigid plastics materials include, for example, acetals and acrylonitrile-butadiene-styrene (ABS) copolymers.

The spiral groove may be cut or molded into the material of the passageway wall or closure member by conventional means depending on the material used and it may, if desired, be defined partly in the passageway wall and partly in the closure member. It may, however, be preferred that the groove be defined in the passageway wall rather than on the closure member.

The closure member may carry one or more sealing rings to engage the wall of the passageway in the first position, i.e. the closure member may engage the wall of the passageway by means of the sealing ring(s) to close the outlet. Alternatively, sealing rings for this purpose may be located in the wall of the passageway. In an alternative embodiment, the closure member and passageway wall may be a precision fit in the first position to close the outlet without a seal.

As indicated above, the valves of the invention are particularly useful for incorporation into the dispense head of a beverage dispenser where they may be used to control the flow of fluids to be mixed at the dispense valve, e.g. syrup and carbonated water, or they may be incorporated into a coolant manifold for use in cooled beverage dispense systems. A typical manifold may contain a plurality of valves controlling outlets for the coolant, the valves being spaced along a common manifold. Each valve may comprise a housing containing a passageway from the common manifold to the valve outlet.

In a typical coolant manifold, the passageway of each control valve in the manifold will usually comprise at least a portion in the form of a right cylinder, and the closure member will be a corresponding cylinder of outside diameter slightly less than the internal diameter of the passageway, the closure member having an "O"-ring seal attached around its outer surface to seal against the passageway wall. In such an arrangement the spiral groove may extend for an axial length equivalent to almost the full length of the closure member although this is not essential and a shorter axial length may be found satisfactory for many circumstances.

The cross sectional shape of the spiral groove may be part-circular, part-rectangular or other shape but a preferred shape is of V-shape.

More than one spiral groove may be provided and the grooves may commence and/or end at different positions along the passageway whereby greater modulation variety and control may be achieved. Multiple grooves may also be of different cross-sectional area.

The pitch of the spiral groove or grooves, the number of turns comprising the spiral and the pitch relative to the cross-sectional area of the groove are all variables that can be used by the skilled man of the art to achieve his required flow through put and required modulation characteristics. For example, it will be appreciated that the longer the length of the spiral groove, the greater the pressure drop that will prevail as between the inlet and the outlet and the skilled man will take this into account in devising a suitable arrangement for his particular requirements.

The valve may conveniently be accurately set in any desired position from filly closed to fully open by means of, for example, a lever mechanism, a stepper motor, e.g. of the pulsed magnetically driven type, a proportional solenoid actuator, a diaphragm operated mechanism, or the like. When the valve is to be repeatedly open and closed a stepper motor or proportional solenoid actuator means may be preferred. Stepper motors, for example, can provide particularly accurate incremental increases or decreases in flow control.

Depending on the desired particular construction, the spiral groove or grooves in the passageway may increase in cross-sectional area in the upstream or downstream direction. In the latter case, the valves have the added advantage of having greater self-cleaning properties, i.e. larger particles can pass more readily through the valve in the open position without causing partial blockage than for a conventional valve having an annular passageway of the same throughput.

Embodiments of the invention will now be described, by way of example only, with reference to the accompanying drawings in which.

Figure 1:
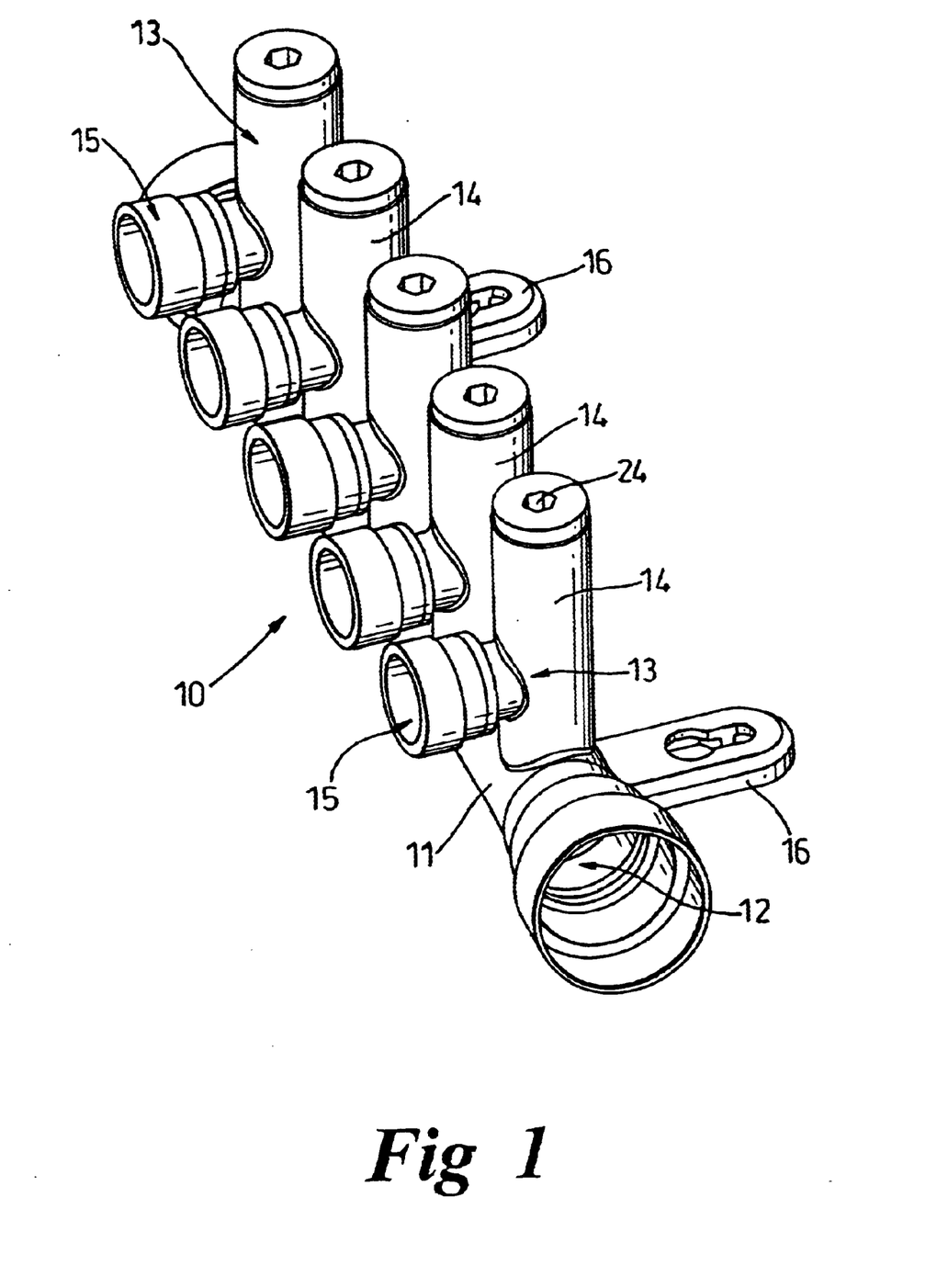
FIG. 1 is an isometric view of a coolant manifold for use in a cooled beverage dispense system.

In FIG. 1, a coolant manifold 10 has a common manifold body 11 defining manifold passageway 12. Body 11 carries a series of outlet valves 13, each comprising a housing 14 and an outlet 15, and has integral lugs 16 by means of which it can be secured in the desired position.

Figure 2:
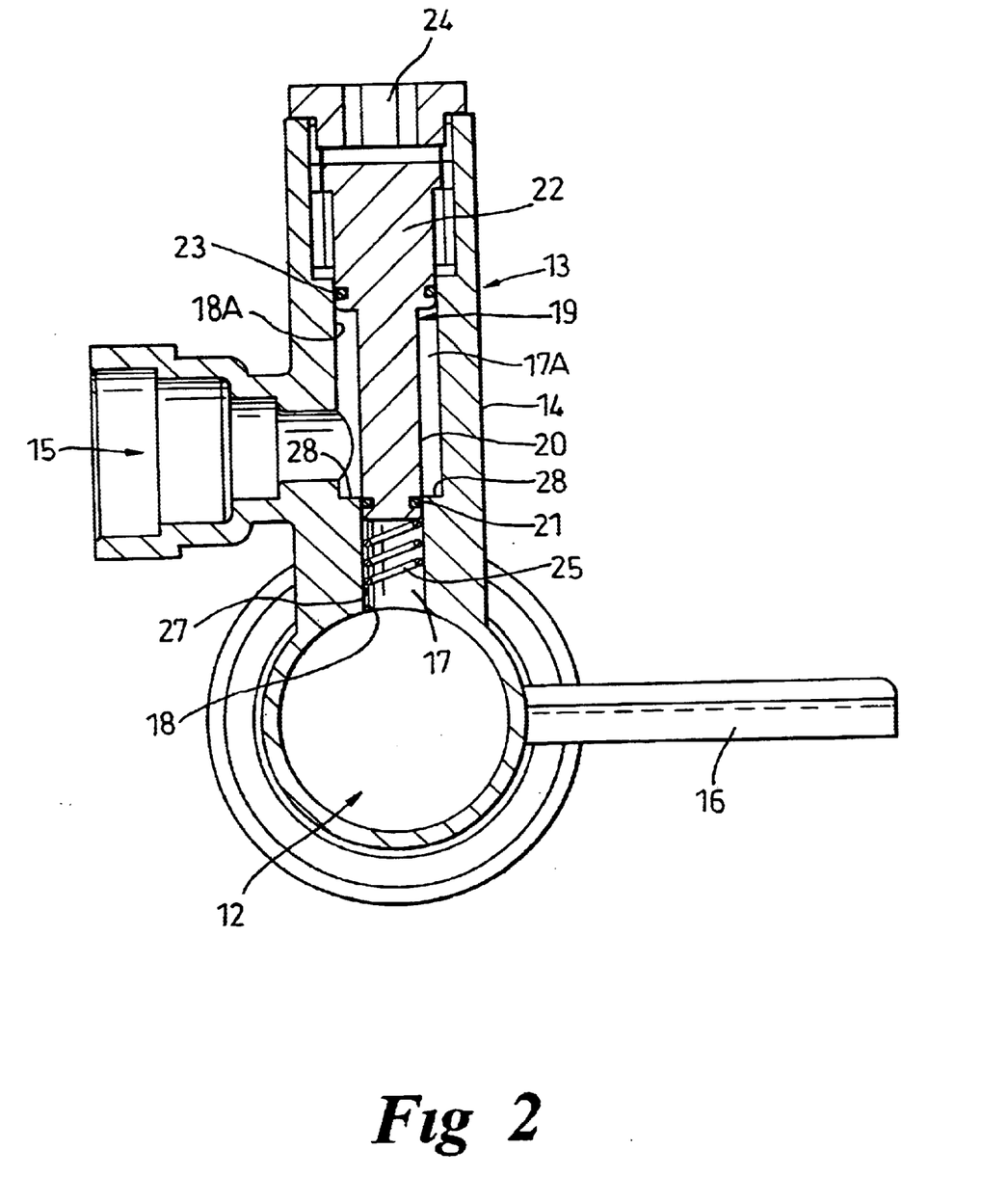
FIG. 2 is a cross-section through one of the valves of the manifold of FIG. 1.

As shown in FIG. 2, outlet 15 of valve 13 is connected to manifold passageway 12 by valve passageway 17. Passageway 17 is of right cylindrical shape and is defined by the lower, cylindrical wall 18 of housing 14.

Housing 14 contains a valve closure member 19 having a cylindrical stem portion 20 carrying towards its inlet (lower) end an "O"-ring 21. Stem portion 20 is of external diameter relative to the diameter of valve passageway 17 such that its "O"-ring 21 seals against wall 18.

Stem portion 20 continues into a stepped portion 22 of the closure member 19 which is of larger diameter than stem portion 20 and seals by means of an "O"-ring 23 against the housing wall 18A at an upper, wider cylindrical chamber 17A into which passageway 17 leads. Stepped portion 22 of closure member 19 is connected at its end remote from stem portion 20 to an Allen key operated means 24 by means of which the closure member 19 may be set to the desired position, i.e. raised and lowered to fully close, partially open or fully open a flow channel through valve passageway 17.

The valve is shown in the almost fully open position in FIG. 2. A spiral groove 25, is formed in the housing wall 18. The groove extends from a point 27 on wall 18 which is downstream of the position at which "O"-ring 21 contacts wall 18 in the fully closed position of the valve, to an annular ledge 28 where the wider chamber 17A commences and which represents the fully open position of the valve. The upper end of groove 25 is hidden behind closure member 20 in FIG. 2.

The groove 25 is of tapering cross-section and increases in cross-sectional area in the downstream direction. It is, therefore, of greater cross-sectional area at its upper end where it meets shelf 28, than at its lower end 26, which commences from point 27 on the wall 18.

FIGS. 3 to 17 show a number of different possible spiral groove arrangements and cross-sections.

Figure 3A:
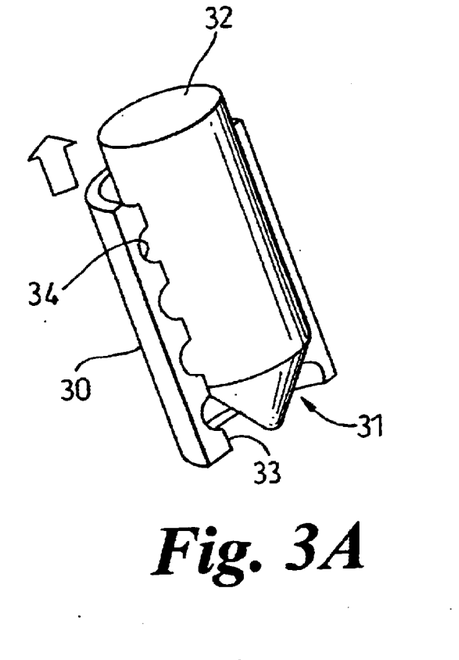
FIGS. 3A and 3B are part sectional views of a valve arrangement in which a spiral groove is formed in the passageway wall of a valve housing.
Figure 3B:
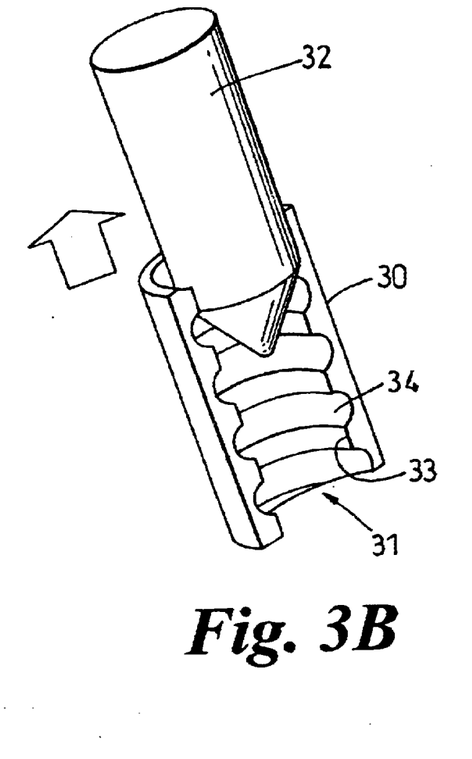

In FIGS. 3A and 3B is shown a portion of a valve housing 30 having a central bore or passageway 31 in which a closure member 32 is a sliding fit. The internal wall 33 of housing 30 carries a spiral groove 34. Groove 34 in conjunction with closure member 32 forms a flow channel for through flow of fluid through the valve when the valve is opened, the length of the flow channel depending on the positioning of closure member 32 within the bore 31. Thus in FIG. 3A, the valve has been opened by movement of closure member 32 in the direction of the arrow to restrict flow by forcing it to pass through the majority of the length of the groove 34, whereas in FIG. 3B, the valve has been opened further to restrict flow only in a short length of groove 34 (at its upper end as shown), the closure member having been moved through bore 31 further in the direction of the arrow.

Figure 4A:
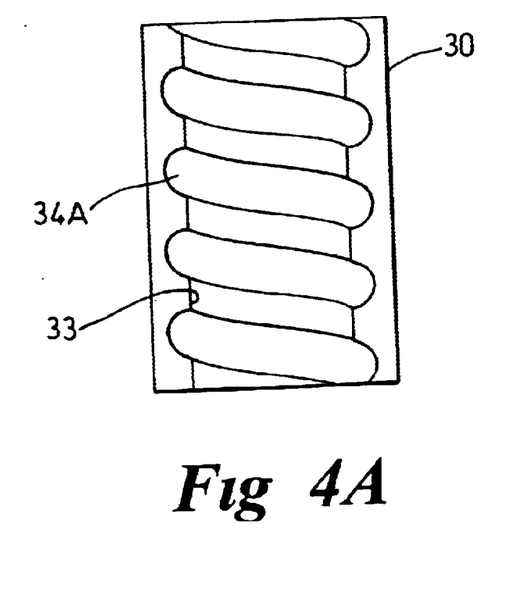
FIGS. 4A and 4B are a diagrammatic illustration of a constant cross-section groove in a passageway wall and a corresponding representation of the flow channel width along its length respectively.
Figure 4B:
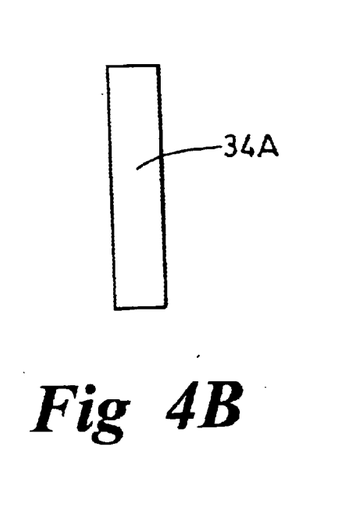

FIG. 4A shows a valve housing 30 with a spiral groove 34A of constant cross-section along the whole of its length in internal wall 33 of the housing. Thus the area for flow through the groove is constant along its length as indicated in FIG. 4B.

Figures 5A, 5B, 6A:
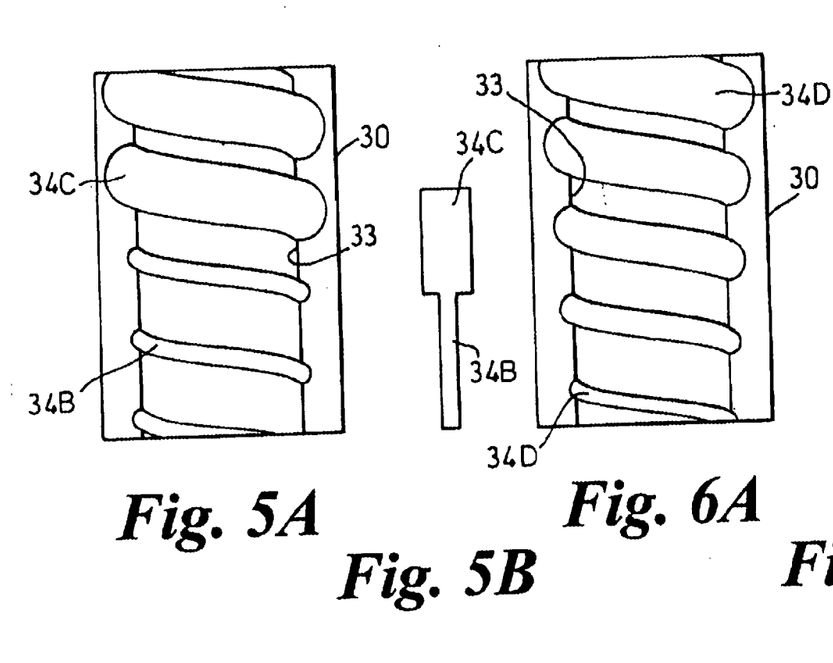
FIGS. 5A and 5B are similar to FIGS. 4A, 4B for a stepped spiral groove.
FIGS. 6A and 6B are similar to FIGS. 4A, 4B for a progressively increasing spiral groove cross-sectional area.

FIG. 5A shows a housing 30 with a spiral groove in two distinct portions 34B and 34C. The length of groove in portion 34B is of constant cross-section as is that of portion 34C but the cross-sectional area of 34B is less than that of 34C. Thus there is a step change in the cross-sectional area of the length of grooved spiral, i.e. of the flow channel, as indicated in FIG. 5B.

Figures 6B, 7A, 7B:
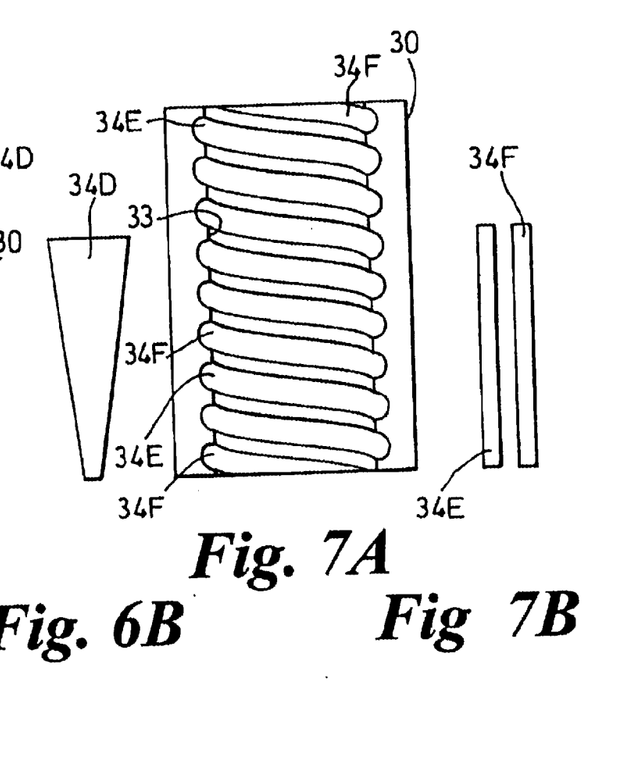
FIGS. 7A and 7B are similar to FIGS. 4A, 4B for a twin spiral arrangement of constant flow channel cross-sectional areas.

FIG. 6A shows a housing 30 with a spiral groove 34D of gradually increasing cross-sectional area along its length as indicated in FIG. 6B.

FIG. 7A shows a housing 30 having two spiral grooves 34E and 34F in its internal wall 33, i.e. this is a two-start spiral thread providing two flow channels. Both grooves are of constant cross-section, as indicated in FIG. 7B.

It will be appreciated that a number of further variations are possible. An increase in groove cross-sectional area, whether stepped or gradual, may be in either the upstream or the downstream flow direction. Where a "two-start" spiral groove arrangement is used, the grooves need not be of constant cross-section and one or both of them may increase in a continuous or stepped manner. The two (or more) grooves need not start at the same point along the length of the bore.

FIGS. 8 to 12 show similar arrangements to those of FIGS. 3 to 7 but with the spiral grooves formed on the closure member rather than on the internal wall of the housing.

Figures 8A, 8B, 9A, 9B:
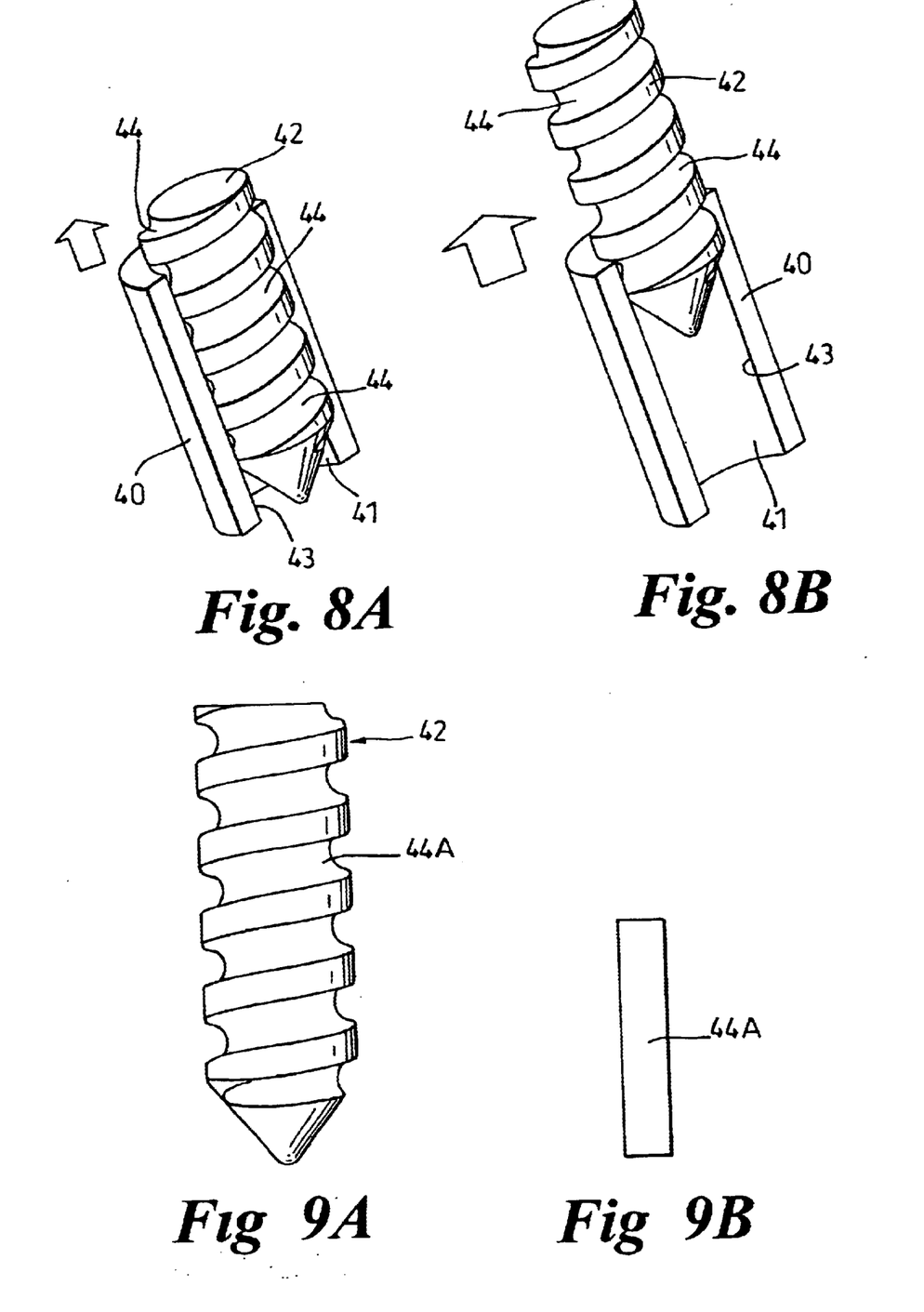
FIGS. 8A and 8B are similar views to FIGS. 3A and 3B but in which the spiral groove is formed on the closure member.
FIGS. 9A, 9B; 10A, 10B; 11A, 11B; and 12A, 12B are similar respectively to FIGS. 4A, 4B; 5A, 5B; 6A, 6B; and 7A, 7B but with the spiral groove on the closure member.

In FIGS. 8A and 8B is shown a portion of a valve housing 40 having a central bore 41 in which a closure member 42 is a sliding fit. The outer surface of the closure member carries a spiral groove 44. Groove 44 in conjunction with the internal wall 43 of the housing forms a flow channel for fluid through the valve when the valve is opened, the length of the flow channel again depending on the position of closure member 42 within bore 41.

Thus in FIG. 8A the valve has been opened by movement of closure member 42 in the direction of the arrow whereby flow is restricted by having to pass through almost the full length of groove 44. In FIG. 8B, the closure member has been moved further in the direction of the arrow so that flow has only to pass through a short length of the groove.

FIG. 9A shows a closure member 42 with a spiral groove 44A, the groove being of constant cross-section along its length, as indicted in FIG. 9B.

Figures 10A, 10B, 11A, 11B, 12A, 12B:
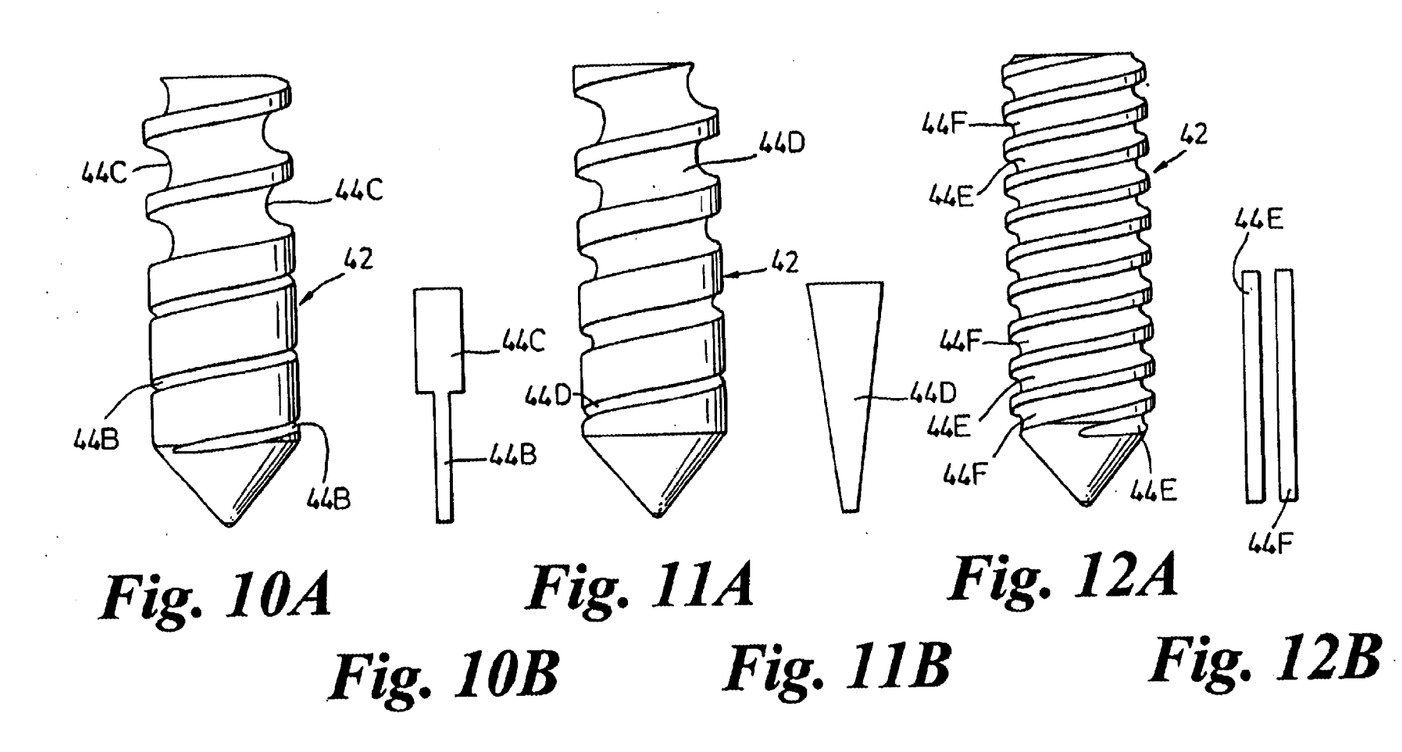

FIG. 10A shows a closure member 42 with a spiral groove in two distinct portions 44B and 44C. The entire length of groove in portion 44B is of constant cross-section as is that of portion 44C but the cross-sectional area of 44B is less than that of 44C. Thus there is a step change in the cross-sectional area of the grooved spiral, i.e. of the flow channel, as indicated in FIG. 10B.

FIG. 11A shows a closure member 42 with a spiral groove 44D of gradually increasing cross-sectional area as indicated in FIG. 11B.

FIG. 12A shows a closure member 42 having two spiral grooves 44E and 44F on its outer surface, i.e. another two-start spiral thread. Both grooves are of constant cross-section, as indicted in FIG. 12B.

As with FIGS. 4 to 7, it will be appreciated that a number of similar further variations are possible in the groove design.

Figure 13A:
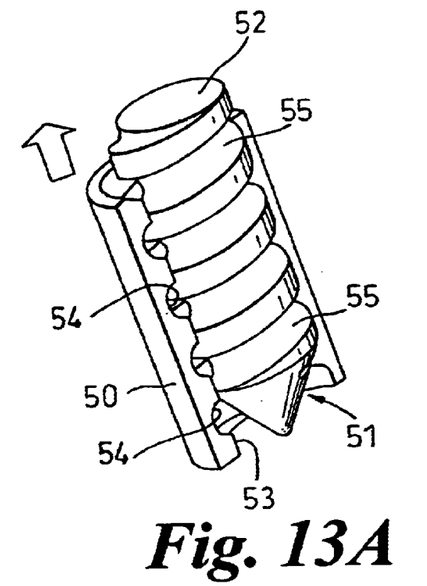
FIGS. 13A and 13B are similar views to FIGS. 4A and 4B but in which the spiral groove is formed both on the closure member and on the passageway wall.
Figure 13B:
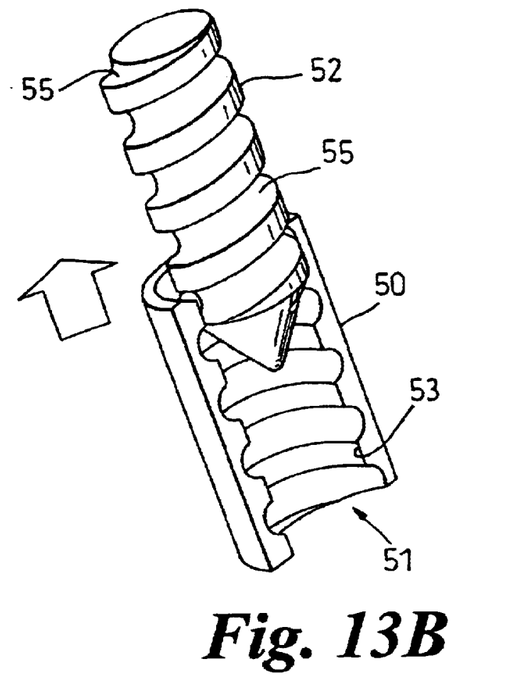

In FIGS. 13A and 13B is shown a portion of a valve housing 50 having a central bore 51 in which a closure member 52 is a sliding fit. Both the inner surface 53 of the housing 50 and the outer surface of the closure member 52 carry a spiral groove, the groove on the inner surface 53 being denoted by reference 54 and that on the closure member by reference 55. The two spiral grooves co-operate to form a flow channel through the valve when it is opened.

In FIG. 13A the valve has been opened by movement of closure member 52 in the direction of the arrow to allow restricted flow through the majority of the length of co-operating grooves 54 and 55. In FIG. 13B the closure member 52 has been moved further in the direction of the arrow so that flow only has to pass through a short length of the groove.

Figure 14A:
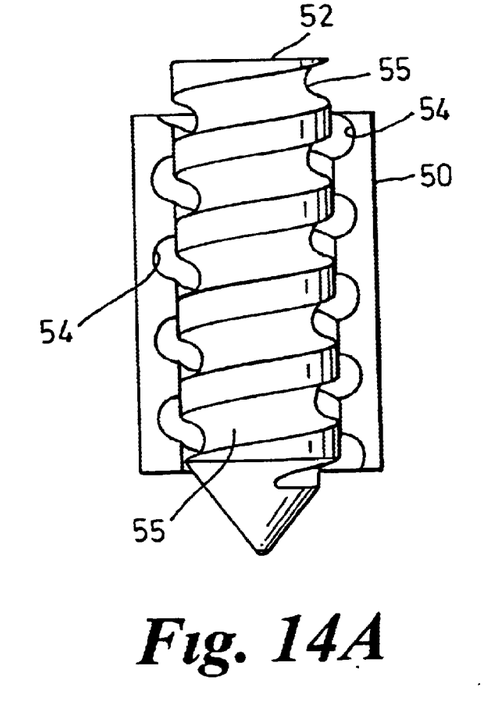
FIGS. 14A and 14B are similar views to FIGS. 3A and 3B in which the spiral groove is formed on both the closure member and on the passageway wall and is of constant cross-sectional area.
Figure 14B:
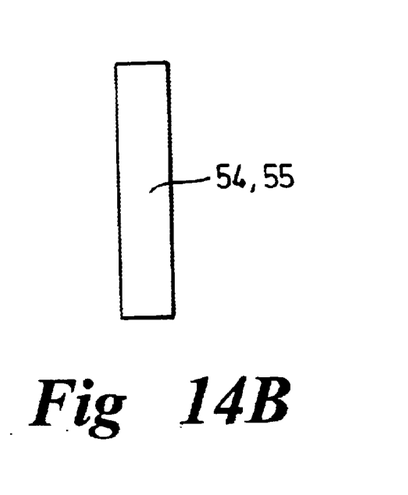

FIG. 14A shows a closure member 52 in the central bore of a valve housing 50 in which the grooves 54 and 55 are of constant cross-section along their lengths. This is represented in FIG. 14B by the constant total area of 54 and 55 along their lengths.

It will be appreciated that where the spiral grooves are formed on both the closure member and the internal wall of the housing, they are not restricted to the arrangements shown in FIGS. 13 and 14 but may take any of the forms described above with reference to FIGS. 4 to 12. Moreover, if desired, the groove on one member may be of different cross-sectional shape to that on the other member and they may start at different positions along the passageway bore.

In the examples given above, it will also be appreciated that, for example, if a groove is increasing in cross-sectional area in the downstream flow direction, the further that the closure member is moved in the downstream direction on opening the valve, the greater the cross-sectional area of flow channel that is made available for fluid through flow. The flow through a valve can, therefore, be very accurately and linearly modulated using the invention.

Figures 15A, 15B:
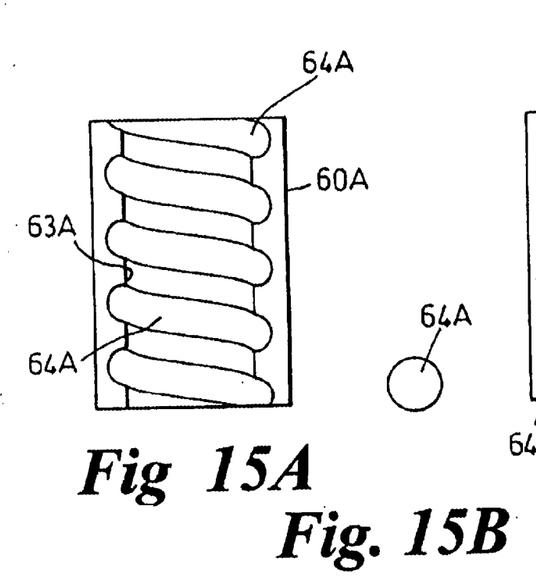
FIGS. 15A and 15B show a spiral groove of circular cross-section.
Figures 16A, 16B, 17A, 17B:
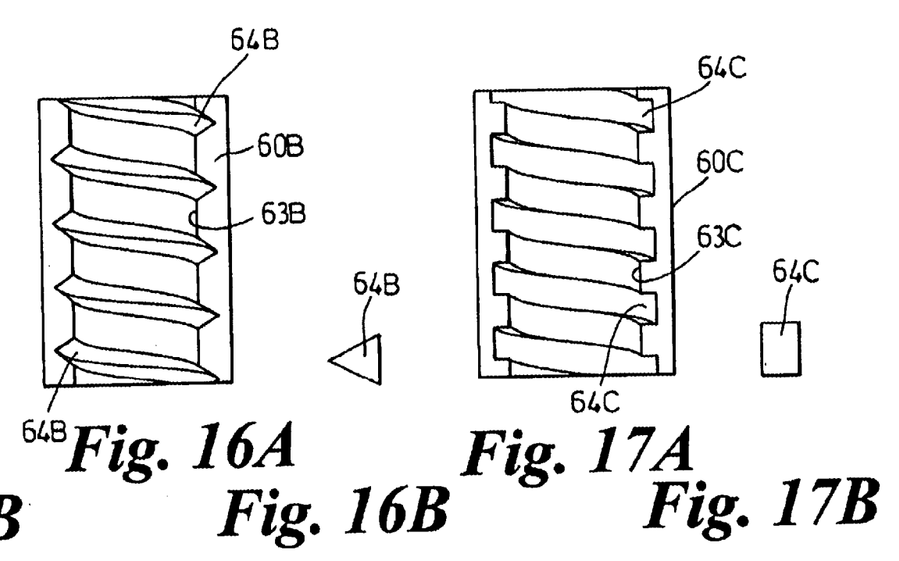
FIGS. 16A and 16B show a spiral groove of triangular or V-shaped cross-section.
FIGS. 17A and 17B show a spiral groove of square cross-section.

In FIGS. 15, 16 and 17 are illustrated spiral grooves of different cross-sectional shapes. In each of these Figures the grooves are shown formed in the internal wall of a bored valve housing but they can be applied equally to spiral grooves formed on the closure member or on both the closure member and the housing internal wall.

In FIGS. 15A and 15B, the spiral groove 64A in the internal wall 63A of valve housing 60A is of circular cross-section.

In FIGS. 16A and 16B, the spiral groove 64B in the internal wall 63B of valve housing 60B is of triangular cross-section.

In FIGS. 17A and 17B, the spiral groove 64C in the internal wall 63 of valve housing 60C is of square cross-section.

Clearly, many other cross-sectional groove shapes may be used, as desired.

What is claimed is:

1. A beverage dispensing valve to control flow of a beverage fluid, the valve comprising:
   a housing containing a passageway between an inlet and an outlet of the valve, an electrically actuated closure member movable in the passageway from a first position in which the valve is fully closed to a second position in which the valve is fully open, the closure member engaging the wall of the passageway to seal the passageway, the wall of the passageway and/or the closure member defining a spiral groove which acts as a flow channel through which the fluid can flow on its passage from the inlet to the outlet when the valve is open, movement of the closure member from the first position towards the second position opening the flow channel through the spiral groove.

2. A valve according to claim 1, in which the spiral groove progressively increases in transverse cross-sectional area in the upstream or downstream direction.

3. A valve according to claim 1, in which the cross-sectional area of the spiral groove increases or decreases in the upstream or downstream direction.

* * * * *